(No Model.)

K. REICHWEIN.
COMBINED PLOW AND SEEDER.

No. 509,946.

2 Sheets—Sheet 1.

Patented Dec. 5, 1893.

Witnesses
Harry L. Amer
W. S. Duvall

Inventor
Konrad Reichwein.
By his Attorneys.
C. A. Snow & Co.

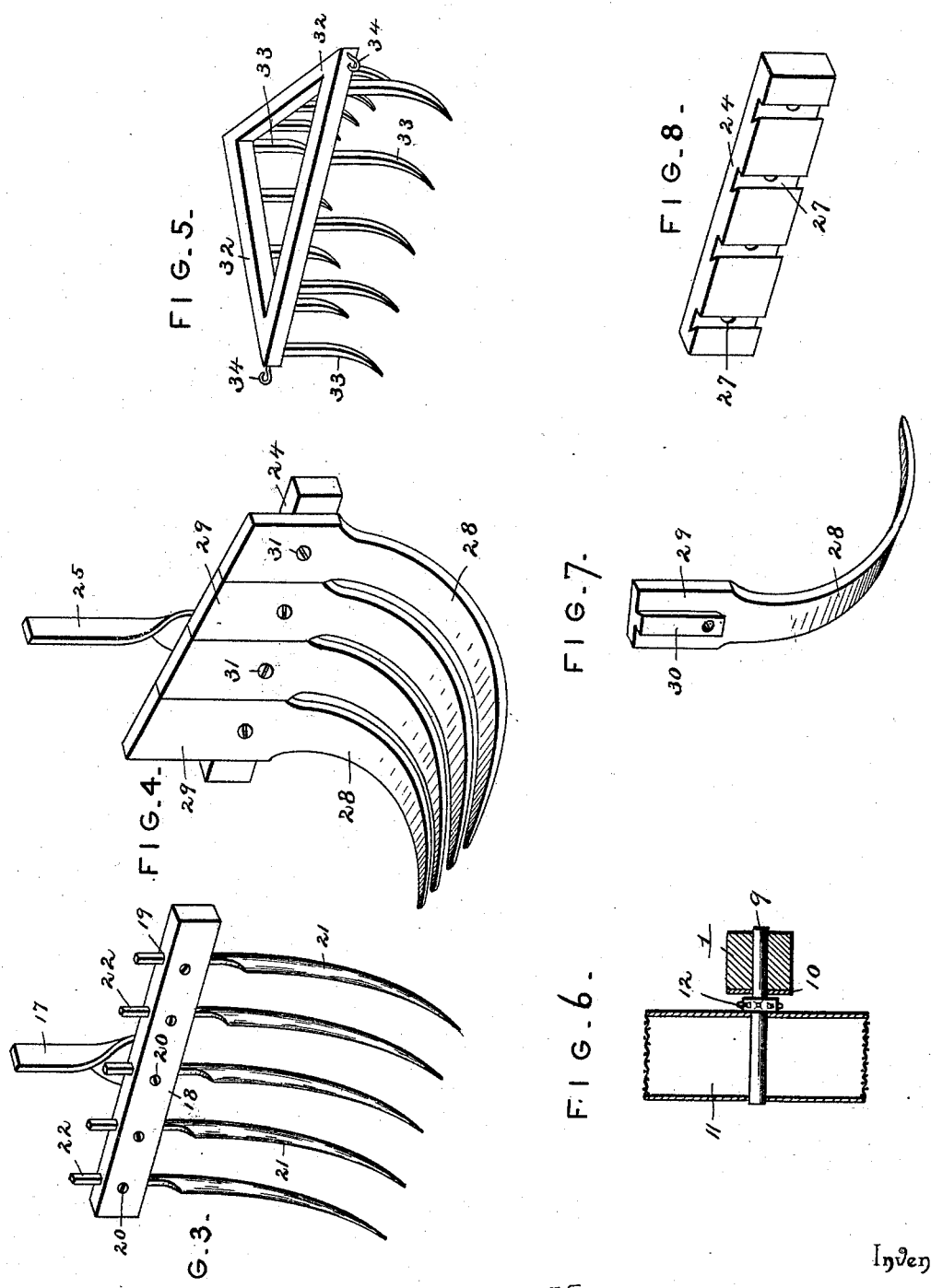

UNITED STATES PATENT OFFICE.

KONRAD REICHWEIN, OF BIRMINGHAM, ALABAMA.

COMBINED PLOW AND SEEDER.

SPECIFICATION forming part of Letters Patent No. 509,946, dated December 5, 1893.

Application filed July 12, 1893. Serial No. 480,279. (No model.)

*To all whom it may concern:*

Be it known that I, KONRAD REICHWEIN, a citizen of the United States, residing at Birmingham, in the county of Jefferson and State of Alabama, have invented a new and useful Combination Plow and Seeder, of which the following is a specification.

My invention relates to improvements in agricultural implements, and to that particular class thereof known as seeders.

The objects of my invention are to provide a machine of cheap, simple and durable construction adapted to prepare the soil for the reception of the seed; thoroughly pulverizing the same; to drop the seed; and finally to cover or harrow the soil, all in one continuous, unbroken operation; and furthermore, to provide for a ready repair of any of the parts should they become broken, and an adjustment for the same, whereby the machine may be caused to plant the desired depth.

With these and other objects in view the invention consists in certain features of construction hereinafter specified and particularly pointed out in the claims.

Figure 1:
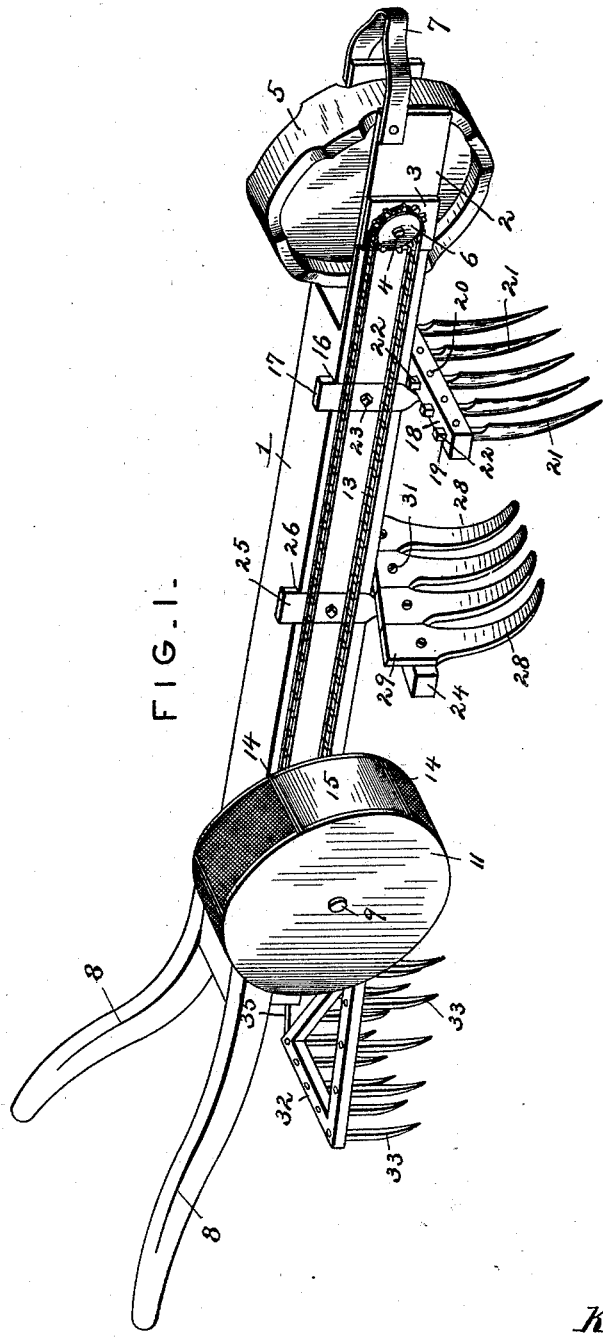
Figure 2:
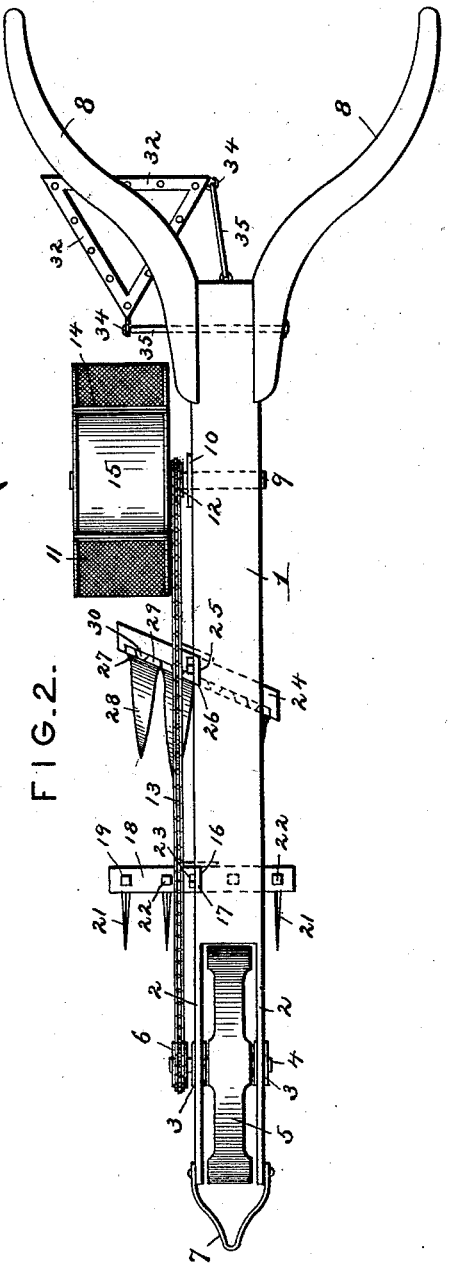

Referring to the drawings:—Figure 1 is a perspective view of a seeder embodying my invention. Fig. 2 is a plan view. Fig. 3 is a detail of the front cutters. Fig. 4 is a similar view of the turning plow. Fig. 5 is a detail of the harrow. Fig. 6 is a transverse sectional view of the machine through the hopper. Fig. 7 is a detail in perspective of one of the tines of the plow, the view being taken from the rear. Fig. 8 is a detail in perspective of the head or bar in which the tines are secured.

Like numerals of reference indicate like parts in all the figures of the drawings.

In my invention I employ a beam 1, preferably made of wood, though if desired it may be of metal, and bifurcate the front end thereof, forming the forward extensions 2, which are provided at opposite sides with metal bearing plates 3 set therein and which accommodate a front axle 4 mounted revolubly in the bearing plates and projecting at one side beyond the same. Between the bifurcations the axle accommodates a ground-wheel 5, the same being of broad-tread, and beyond the bearing plates at one end said axle accommodates a sprocket wheel 6.

The front ends of the extensions 2 are connected by a substantially V-shaped clevis loop 7 to which the usual draft appliances may be connected. Of course the rear end of the beam is provided with suitable handles, the same in this instance being curved and secured in position by means of proper bolts. A transverse shaft 9 is journaled in the beam, and in bearing plates 10 let therein immediately in front of the handles 8, said shaft projecting beyond the face of the beam and at that side thereof at which the axle 4 projects. Upon this extension of the shaft there is located a cylindrical revoluble hopper 11, and at the inner side thereof upon the same shaft there is located a sprocket wheel 12 which is connected with the sprocket wheel 6 through the medium of a driving-chain 13.

The hopper 11 may be of any suitable construction but is preferably provided with a reticulated or perforated rim as shown and provided at intervals with ways 14 in which curved slide-plates 15 may be seated, whereby the reticulations become closed and egress of the seed arrested.

Let into a recess 16 formed in one side of the beam 1 is a vertical shank or standard 17 which is secured to an intermediate point of a metal cross-head or bar 18. This cross-head or bar 18 is provided at intervals with a series of angular openings 19, the same being vertically disposed and registering with each, and formed in the front face of the bar is a threaded opening in which is mounted a screw 20.

21 designates a series of curved cutters or knives, which are tapered toward their lower ends and in cross-section are triangular, their front angles forming cutting-edges. Toward their upper ends or butts they are reduced forming angular shanks 22 which fit within the openings 19 formed in the cross-bar or head 18, and are maintained in position therein by means of the screws 20 which bind thereupon. It will be seen that through the medium of the screws the knives may be vertically adjusted. The shank 17 is secured in position in the recess 16 by means of a transverse bolt 23, or other means may be employed if so desired.

Rising from a transverse bar or head 24 in rear of the knives 21 is a vertical standard 25, and the same is let into a recess 26 with which the beam 1 is provided at the same side thereof as is located the recess 16. This bar is set diagonally to the line of draft, and has formed in its front face a series of dovetail grooves 27, the same being vertically disposed, as shown. A series of curved pointed tines 28 are located upon the front face of the bar 24, and at their upper ends are widened, forming securing plates 29, upon whose rear sides are formed dovetail ribs 30, which fit within the grooves 27. The plates 29 are perforated, and through the same pass screws 31, the same taking into the cross-bar or head 24 and serving to secure the tines in position. These tines are disposed somewhat after the fashion of a turning plow, and by the disposition of the device as a whole serve as such. The tines themselves, however, are spaced apart so that soil may pass therethrough and be more thoroughly pulverized than by a mere turning.

Below the rear end of the beam slightly to one side of the same in the path traversed by the cylindrical hopper is a triangular harrow frame 32 from which curved pointed harrow teeth 33 depend. The frame is provided at its front and inner angle with hooks 34, and brace-rods 35 lead therefrom to the side and rear of the beam 1, so that as will be obvious the harrow is dragged over that portion of the soil in which the seed is dropped.

This completes the construction of the machine and the operation thereof may be briefly explained as follows:—The machine moving over the ground causes the ground wheel 5 to rotate, which communicates motion to its axle 4 and the sprocket wheel 6, which latter through the medium of the driving chain 13 rotates the sprocket wheel 12 and the revoluble hopper 11. This hopper being provided with perforations or with a reticulated rim feeds the seed therefrom in a manner obvious. The knives 21 take into the soil eight or ten inches, thoroughly loosening the same, and the loose soil is then caught by the turning fork or shovel 28 and is thoroughly pulverized thereby and cast to one side. Into this loose soil thus cast the seed from the hopper drops, and the same is again operated upon by the harrow, the seed being turned thereunder and mixed with the soil in a manner obvious. If at any time the tines 28 or the knives should become worn or broken they may be readily replaced by a simple unscrewing of the screws or bolts 20 and 31 and a removal thereof, together with the broken member, the latter being substituted by a new member.

It will be seen that I have provided a cheap and simple machine of strong and durable construction, the same being so constructed as to adapt it to effectually and continuously plow the soil, pulverize the same, and cast it into the path of the hopper, and finally mix the soil with the seed dropped by the hopper.

Changes in the form, proportion, and minor details of construction may be resorted to without departing from the principle or sacrificing any of the advantages of this invention.

Having described my invention, what I claim is—

1. In a seeder, the combination with a beam, an axle at the front end thereof, and a shaft in rear of the axle, of a revoluble hopper, and a sprocket wheel mounted on the shaft, the hopper being provided with seed-openings, a ground wheel and sprocket wheel mounted on the axle a chain belt connecting the two sprocket wheels, pulverizing-devices carried by the beam between the ground-wheel and hopper, and pulverizing-devices located in rear of the hopper and connected to the beam, substantially as specified.

2. In a seeder, the combination with a beam, a front axle, a rear shaft, a hopper, and sprocket wheel mounted on the rear shaft, a ground wheel and sprocket wheel mounted on the axle, and a drive chain between the sprocket wheels, of a knife carrying frame arranged transversely under the beam in rear of the ground wheel, a turning device arranged under the beam in rear of the knife carrying frame, and a harrow frame connected with the beam in rear of the hopper, substantially as specified.

3. In a seeder, the combination with a beam, a revoluble hopper, and means for operating the same, of a transverse bar connected with the beam in rear of the ground wheel and provided with angular openings, a series of cutters tapered toward their lower ends, triangular in cross-section and provided with angular shanks mounted in the openings and depending from the bar, binding screws passed through perforations in the bar and bearing on the shanks, a rear diagonally disposed bar connected with the beam and having in its front face dove tail grooves, a series of tines, curved, pointed, and spaced apart applied to the front face of said bar and terminating at their upper ends in widened plates, provided upon their rear sides with dovetail ribs, and screws passed through the plates into the bar, and a harrow frame arranged in rear of and connected with the beam, substantially as specified.

4. In a seeder, the combination with the beam having the front bifurcated end provided with opposite bearings, the ground wheel, the axle, and the sprocket wheel, the rear bearing plate, the transverse shaft extending beyond the same, the revoluble hopper and sprocket wheel carried by the shaft, the drive chain connecting the two sprocket wheels, of the cutting device arranged below the beam in rear of the wheel, the turning device arranged in rear of the cutting device, and the harrow arranged in rear of the beam and hopper, substantially as specified.

5. The combination with the beam having the front and rear recesses, the vertical shanks 17 and 25 secured in the recesses, of the front and rear bars 19 and 24 secured to the shanks, said bars having recesses, the curved pointed cutters depending from the front bar, and the curved turning tines depending from the rear bar, substantially as specified.

6. In a combined plow and seeder, the beam provided at its front end with the ground-wheel 5, the shaft of which carries a sprocket-wheel, the cutting device secured to the beam in rear of the ground-wheel and having a series of triangular cutters arranged at right angles to the beam and tapered toward their lower ends, the turning device arranged in rear of the cutting device and also secured to the beam but at an obtuse angle thereto so as to throw the earth to one side, said turning device having a series of curved pointed tines, and the revoluble hopper arranged in rear of the turning device and having a sprocket-wheel on its shaft connected with the sprocket of the ground-wheel shaft, substantially as described.

7. The turning device consisting of the shank 25 adapted to be connected at its upper end to the beam, the bar 24 provided with dovetail grooves 27, having perforations and secured to the lower end of the shank and the curved tines 28 having dovetail ribs 30 on their rear sides fitting the grooves, and screws passed through the tines and ribs and into the bar substantially as described.

8. In combination with the revoluble hopper, and the beam on which it is mounted, the triangular harrow-frame 32 provided at its front and inner angles with hooks 34, and brace rods 35 secured to the side and also to the rear of the beam and connected to the hooks of the harrow-frame, whereby the latter is held from turning and yet a vertical movement of the same is permitted, substantially as specified.

In testimony that I claim the foregoing as my own I have hereto affixed my signature in the presence of two witnesses.

KONRAD REICHWEIN.

Witnesses:
J. H. HEINEKE,
F. FLECK.